United States Patent
Hong et al.

(10) Patent No.: US 6,504,942 B1
(45) Date of Patent: Jan. 7, 2003

(54) METHOD OF AND APPARATUS FOR DETECTING A FACE-LIKE REGION AND OBSERVER TRACKING DISPLAY

(75) Inventors: Qi He Hong, Abingdon (GB); Nicolas Steven Holliman, Wallingford (GB); David Ezra, Wallingford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/229,187

(22) Filed: Jan. 13, 1999

(30) Foreign Application Priority Data

Jan. 23, 1998 (GB) ............................................. 9801550

(51) Int. Cl.⁷ ................................................ G06K 9/36
(52) U.S. Cl. ...................... 382/103; 382/118; 382/164; 382/299
(58) Field of Search ................................ 382/103, 118, 382/164, 165, 173, 203, 239, 291, 299; 713/186, 200; 434/155; 345/330, 358, 431, 591, 863; 902/3, 6; 348/14, 14.13, 156, 161, 77; 356/71; 340/5.53, 5.83

(56) References Cited

U.S. PATENT DOCUMENTS

| | | | | |
|---|---|---|---|---|
| 5,557,688 A | * | 9/1996 | Nakamura | 382/164 |
| 5,689,575 A | * | 11/1997 | Sako et al. | 382/118 |
| 5,715,325 A | * | 2/1998 | Bang et al. | 382/118 |
| 5,978,515 A | * | 11/1999 | Katata et al. | 382/243 |
| 6,128,398 A | * | 10/2000 | Kuperstein et al. | 382/118 |

FOREIGN PATENT DOCUMENTS

| | | | |
|---|---|---|---|
| GB | 2238440 | 5/1991 | G01S/3/78 |
| GB | 2288940 | 11/1995 | G06T/7/60 |

OTHER PUBLICATIONS

Agawa, et al., "Image Analysis for Face Modeling and Facial Reconstruction", Proceedings of the SPIE, vol. 1360, Part 2, Oct. 1, 1990, pp. 1184–1197.
Sobottka, et al., "Face Localization and Facial Feature Extraction Based on Shape and Color Information", Proceedings of the International Conference on Image Processing (ICIP), vol. 3, Sep. 16, 1996, pp. 483–486.
European Search Report for Application No. 99300179.1, dated Sep. 28, 2001.
Search Report for GB Application No. GB 9801550.6; Dated May 8, 1998.

* cited by examiner

*Primary Examiner*—Brian Werner
(74) *Attorney, Agent, or Firm*—Renner, Otto, Boisselle & Sklar (57) ABSTRACT

A method of detecting a face-like region of a colour image, comprises reducing the resolution of the colour image by averaging the saturation to form a reduced resolution image and searching for a region of the reduced resolution image. The searched region has, in a predetermined shape, a substantially uniform saturation which is substantially different from the saturation of the portion of the reduced resolution image surrounding the predetermined shape.

20 Claims, 13 Drawing Sheets

Template 11

Region for image averaging 53

METHOD OF AND APPARATUS FOR DETECTING A FACE-LIKE REGION AND OBSERVER TRACKING DISPLAY

The present invention relates to a method of and an apparatus for detecting a face-like region of a colour image. Such a method may be used in association with other methods for detecting a face in an image and for capturing a target image, for instance during the initialisation stage of an image tracking system which may be associated with an observer tracking autostereoscopic display. Such methods and apparatuses have a wide range of applications, for instance in skin colour detection, face detection and recognition, security surveillance, video and image compression, video conferencing, multimedia database searching and computer games.

The present invention also relates to an observer tracking display, for instance of the autostereoscopic type.

Figure 1:
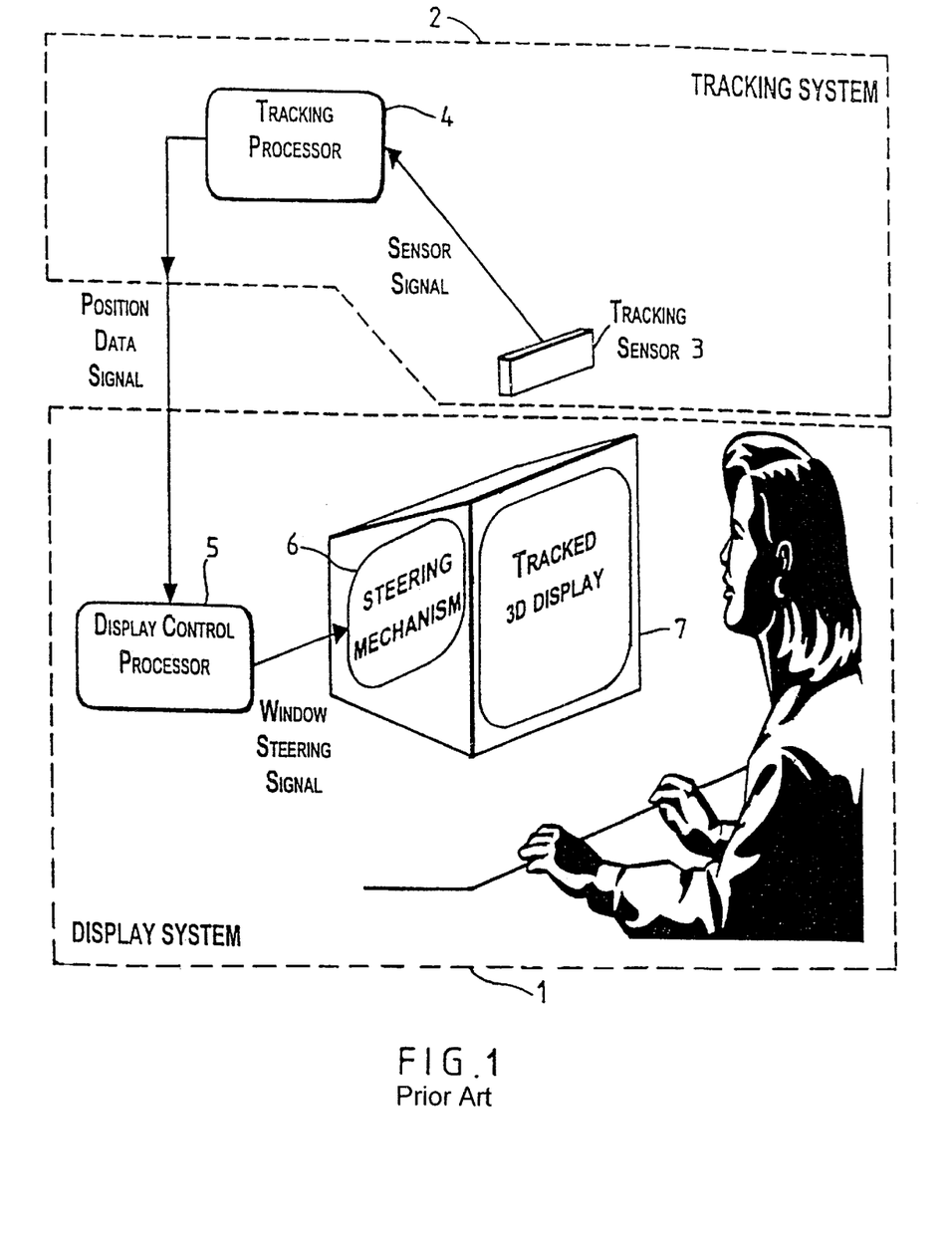
FIG. 1 is a block schematic diagram of a known type of observer tracking autostereoscopic display.

Autostereoscopic displays enable a viewer to see two separate images forming a stereoscopic pair by viewing such displays with the eyes in two viewing windows. Examples of such displays are disclosed in EP 0 602 934, EP 0 656 555, EP 0 708 351, EP 0 726 482 and EP 0 829 743. An example of a known type of observer tracking autostereoscopic display is illustrated in FIG. 1 of the accompanying drawings.

Figure 2:
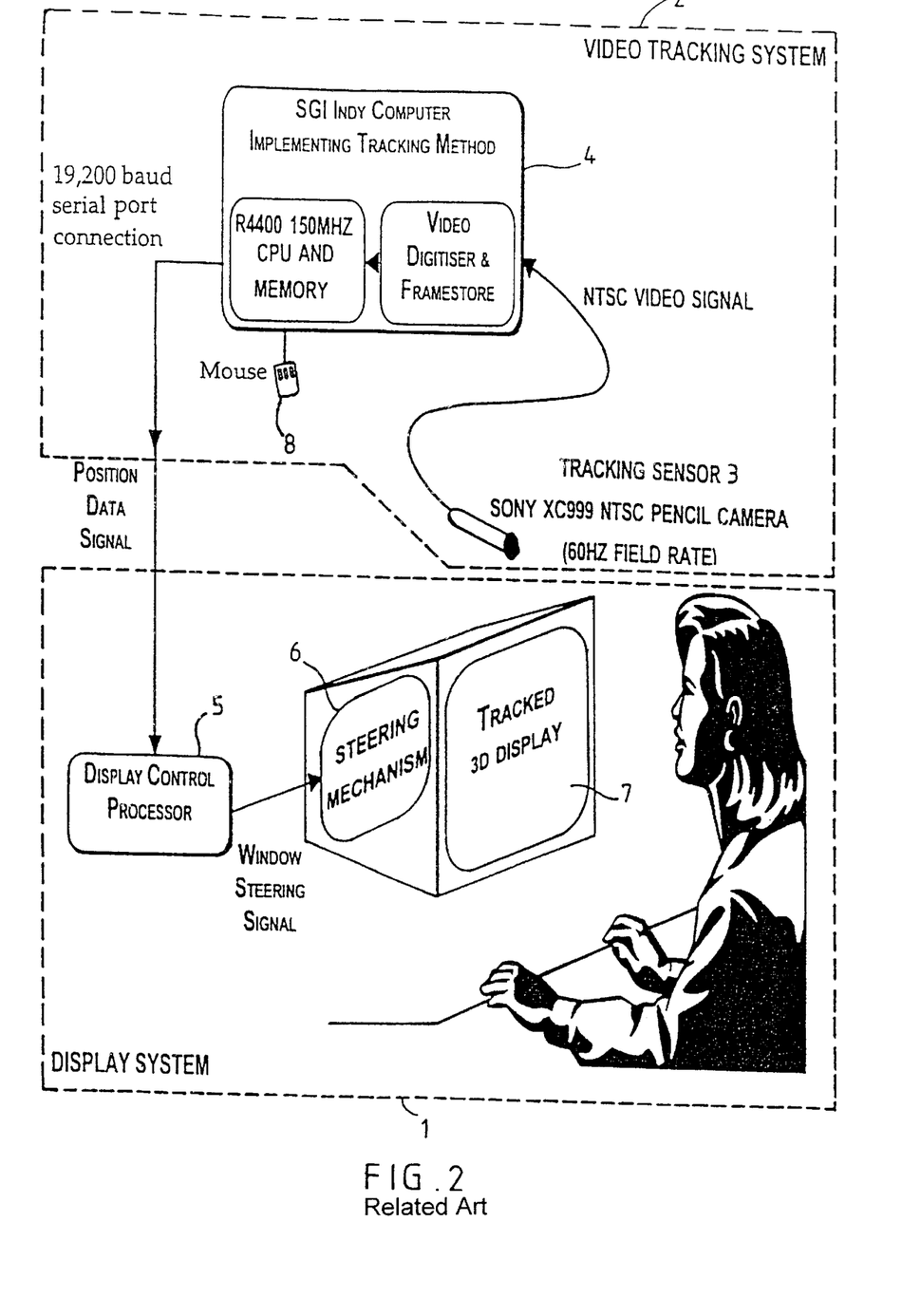
FIG. 2 is a block schematic diagram of an observer tracking display to which the present invention may be applied.

The display comprises a display system 1 co-operating with a tracking system 2. The tracking system 2 comprises a tracking system 3 which supplies a sensor signal to a tracking processor 4. The tracking processor 4 derives from the sensor signal an observer position data signal which is supplied to a display control processor 5 of the display system 1. The processor 5 converts the position data signal into a window steering signal and supplies this to a steering mechanism 6 of a tracked 3D display 7. The viewing windows for the eyes of the observer are thus steered so as to follow movement of the head of the observer and, within the working range, to maintain the eyes of the observer in the appropriate viewing windows. EP 0 877 274 and GB 2 324 428 disclose an observer video tracking system which has a short latency time, a high update frequency and adequate measurement accuracy for observer tracking autostereoscopic displays. FIG. 2 of the accompanying drawings illustrates an example of the system, which differs from that shown in FIG. 1 of the accompanying drawings in that the tracking system 3 comprises a Sony XC999 NTSC video camera operating at a 60 Hz field rate and the tracking processor 4 is provided with a mouse 8 and comprises a Silicon Graphics entry level machine of the Indy series equipped with an R4400 processor operating at 150 Mhz and a video digitiser and frame store having a resolution of 640×240 picture elements (pixels) for each field captured by the camera 3. The camera 3 is disposed on top of the display 7 and points towards the observer who sits in front of the display. The normal distance between the observer and the camera 3 is about 0.85 meters, at which distance the observer has a freedom of movement in the lateral or X direction of about 450 mm. The distance between two pixels in the image formed by the camera corresponds to about 0.67 and 1.21 mm in the X and Y directions, respectively. The Y resolution is halved because each interlaced field is used individually.

Figure 3:
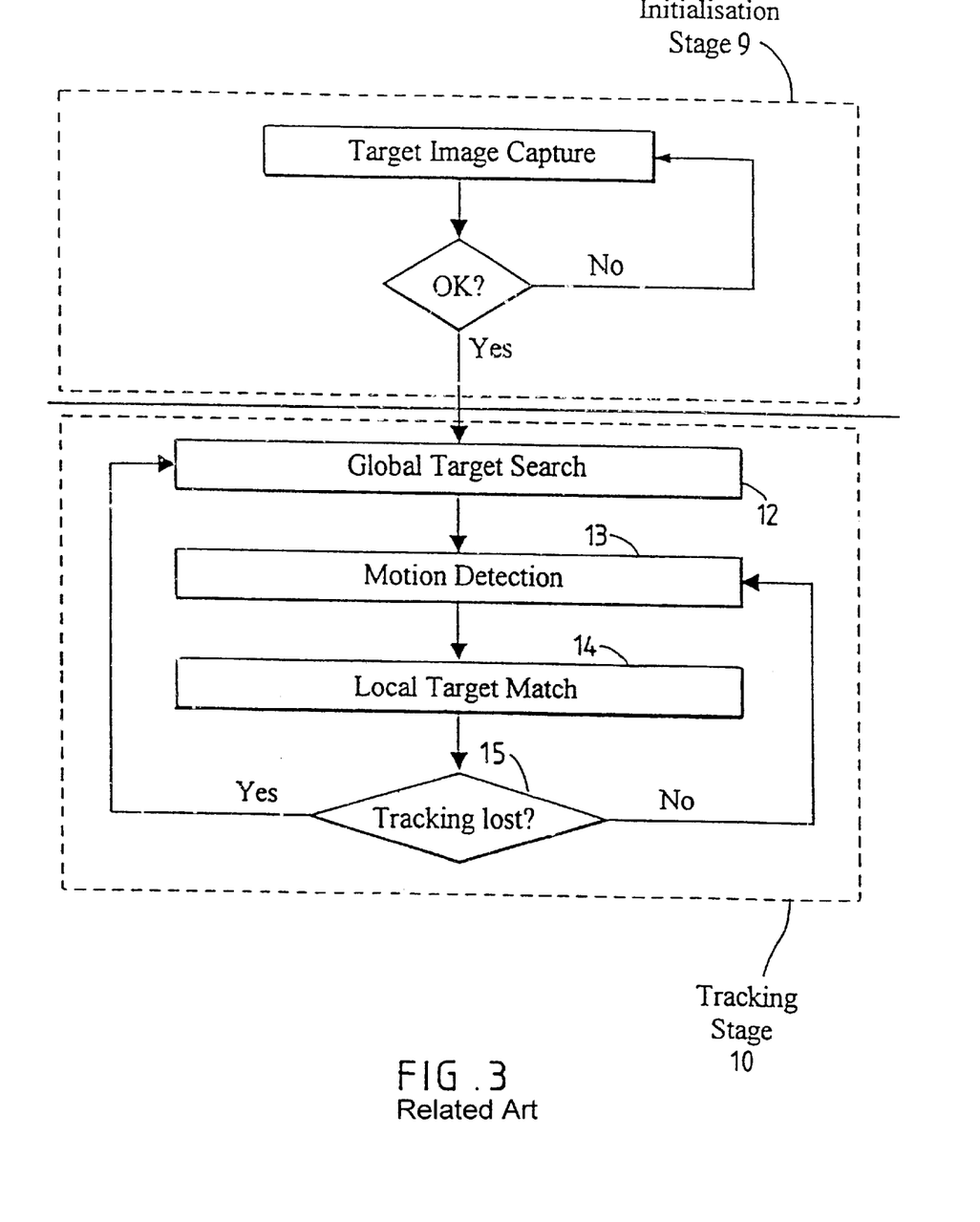
FIG. 3 is a flow diagram illustrating observer tracking in the display of FIG. 2.
Figure 4:
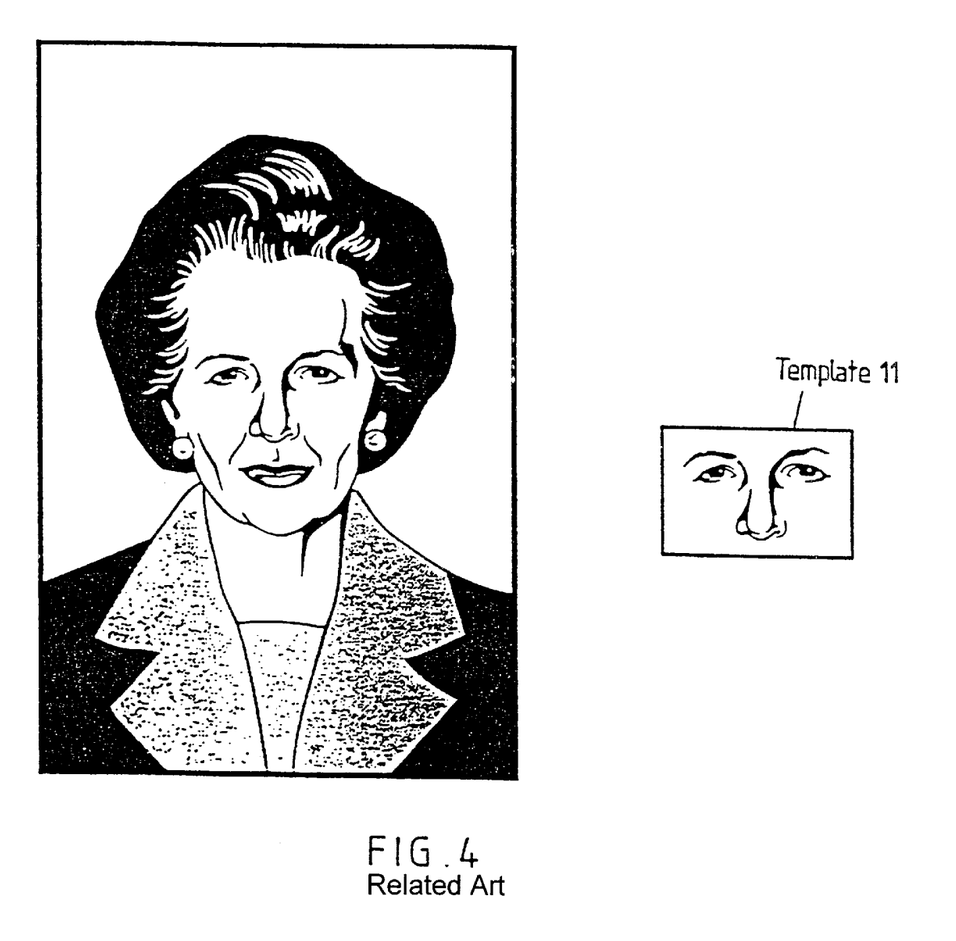
FIG. 4 illustrates a typical target image or template which is captured by the method illustrated in FIG. 3.

FIG. 3 of the accompanying drawings illustrates in general terms the tracking method performed by the processor 4. The method comprises an initialisation stage 9 followed by a tracking stage 10. During the initialisation stage 9, a target image or "template" is captured by storing a portion of an image from the camera 3. The target image generally contains the observer eye region as illustrated at 11 in FIG. 4 of the accompanying drawings. Once the target image or template 11 has been successfully captured, observer tracking is performed in the tracking stage 10.

A global target or template search is performed at 12 so as to detect the position of the target image within the whole image produced by the camera 3. Once the target image has been located, motion detection is performed at 13 after which a local target or template search is performed at 14. The template matching 12 and 14 are performed by cross-correlating the target image in the template with each sub-section overlaid by the template. The best correlation value is compared with a predetermined threshold to check whether tracking has been lost in step 15. If so, control returns to the global template matching step 12. Otherwise, control returns to the step 13.

The motion detection 13 and the local template matching 14 form a tracking loop which is performed for as long as tracking is maintained. The motion detection step supplies position data by a differential method which determines the movement of the target image between consecutive fields and adds this to the position found by local template matching in the preceding step for the earlier field.

Figure 5:
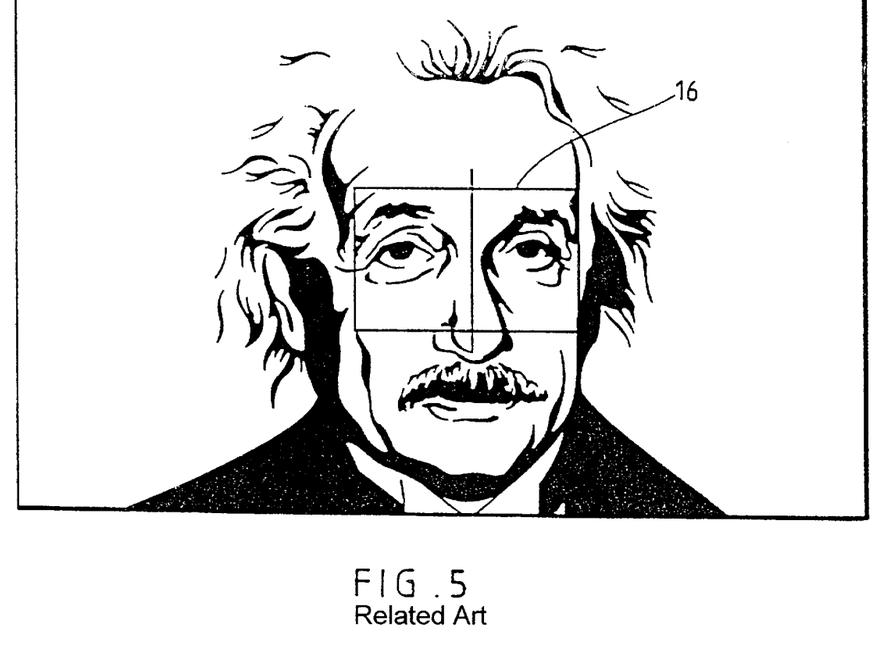
FIG. 5 illustrates the appearance of a display during template capture by the display of FIG. 2.

The initialisation stage 9 obtains a target image or a template of the observer before tracking starts. The initialisation stage disclosed in EP 0 877 274 and GB 2 324 428 uses an interactive method in which the display 7 displays the incoming video images and an image generator, for example embodied in the processor 4, generates a border image or graphical guide 16 on the display as illustrated in FIG. 5 of the accompanying drawings. A user-operable control, for instance forming part of the mouse 8, allows manual actuation of capturing of the image region within the border image.

The observer views his own image on the display 7 together with the border image which is of the required template size. The observer aligns the midpoint between his eyes with the middle line of the graphical guide 16 and then activates the system to capture the template, for instance by pressing a mouse button or a keyboard key. Alternatively, this alignment may be achieved by dragging the graphical guide 16 to the desired place using the mouse 8.

An advantage of such an interactive template capturing technique is that the observer is able to select the template with acceptable alignment accuracy. This involves the recognition of the human face and the selection of the interesting image regions, such as the eye regions. Whereas human vision renders this process trivial, such template capture would be difficult for a computer, given all possible types of people with different age, sex, eye shape and skin colour under various lighting conditions.

Suwa et al, "A Video Quality Improvement Technique for Video Phone and Video Conference Terminal", IEEE Workshop on Visual Signal Processing and Communications, Sep. 21–22 1993, Melbourne, Australia disclose a technique for detecting a facial region based on a statistical model of skin colour. This technique assumes that the colour and brightness in the facial region lie within a defined domain and the face will occupy a predetermined amount of space in a video frame. By searching for a colour region which consists of image pixels whose colours are within the domain and whose size is within a known size, a face region may be located. However, the colour space domain for the skin colour changes with changes in lighting source, direction and intensity. The colour space also varies for different skin colours. Accordingly, this technique requires calibration of the skin colour space for each particular application and system and is thus of limited applicability.

Swain et al, "Color Indexing", International Journal of Computer Vision, 7:1, pages 11 to 32, 1991 disclose the use of colour histograms of multicoloured objects to provide colour indexing in a large database of models. A technique known as "histogram back projection" is then use to locate the position of a known object such as a facial region, for instance as disclosed by Sako et al, "Real-Time Facial-Feature Tracking based on Matching Techniques and its Applications", proceedings of 12 IAPR International Conference on Patent Recognition, Jerusalem, Oct. 6–13 1994, vol II, pages 320 to 324. However, this technique requires knowledge of the desired target, such as a colour histogram of a face, and only works if sufficient pixels of the target image are different from pixels of other parts of the image. It is therefore necessary to provide a controlled background and additional techniques are required to cope with changes of lighting.

Chen et al, "Face Detection by Fuzzy Pattern Matching", IEEE (0-8186-7042-8), pages 591 to 596, 1995 disclose a technique for detecting a face-like region in an input image using a fuzzy pattern matching method which is largely based on the extraction of skin colours using a model known as "skin colour distribution function"(SKDF). This technique first converts the RGB into a Farnsworth colour space as disclosed in Wyszechi et al, "Color Science", John Wiley & Sons Inc, 1982. The SCDF is built by gathering a large set of sample images containing human faces and selecting the skin regions in the images by human viewers. A learning program is then applied to investigate the frequency of each colour in the colour space appearing in the skin regions. The SCDF is then unified and is used to estimate the degree of how well a colour looks like skin colour. Once a region is extracted as a likely skin region, it is subjected to further analysis based on pre-established face shape models, each containing 10×12 square cells. However, a problem with this technique is that the SCDF can vary as the lighting conditions change.

According to a first aspect of the invention, there is provided a method of detecting a face-like region of a colour image, comprising reducing the resolution of the colour image by averaging the saturation to form a reduced resolution image and searching for a region of the reduced resolution image having, in a predetermined shape, a substantially uniform saturation which is substantially different from the saturation of the portion of the reduced resolution image surrounding the predetermined shape.

The colour image may comprise a plurality of picture elements and the resolution may be reduced such that the predetermined shape is from two to three reduced resolution picture elements across.

The colour image may comprise a rectangular array of M×N picture elements, the reduced resolution image may comprise (M/m) by (N/n) picture elements, each of which corresponds to m×n picture elements of the colour image, and the saturation of each picture element of the reduced resolution image may be given by:

$$P = (1/mn)\sum_{i=0}^{m-1}\sum_{j=o}^{n-1} f(i, j)$$

where f(i,j) is the saturation of the picture element of the ith column and the jth row of the m×n picture elements. The method may comprise storing the saturations in a store.

A uniformity value may be ascribed to each of the reduced resolution picture elements by comparing the saturation of each of the reduced resolution picture elements with the saturation of at least one adjacent reduced resolution picture element.

Each uniformity value may be ascribed a first value if $$(\max(P)-\min(P))/\max(P) \leq T$$

where max(P) and min(P) are the maximum and minimum values, respectively, of the saturations of the reduced resolution picture element and the or each adjacent picture element and T is a threshold, and a second value different from the first value otherwise. T may be substantially equal to 0.15.

The or each adjacent reduced resolution picture element may not have been ascribed a uniformity value and each uniformity value may be stored in the store in place of the corresponding saturation.

The resolution may be reduced such that the predetermined shape is two or three reduced resolution picture elements across and the method may further comprise indicating detection of a face-like region when a uniformity value of the first value is ascribed to any of one reduced resolution picture element, two vertically or horizontally adjacent reduced resolution picture elements and a rectangular two-by-two array of picture elements and when a uniformity value of the second value is ascribed to each surrounding reduced resolution picture element.

Detection may be indicated by storing a third value different from the first and second values in the store in place of the corresponding uniformity value.

The method may comprise repeating the resolution reduction and searching at least once with the reduced resolution picture elements shifted with respect to the colour image picture elements.

The saturation may be derived from red, green and blue components as $$(\max(R,G,B)-\min(R,G,B))/\max(R,G,B)$$

where max(R,G,B) and min(R,G,B) are the maximum and minimum values, respectively, of the red, green and blue components.

The method may comprise capturing the colour image. The colour image may be captured by a video camera and the resolution reduction and searching may be repeated for different video fields or frames from the video camera. A first colour image may be captured while illuminating an expected range of positions of a face, a second colour image may be captured using ambient light, and the second colour image may be subtracted from the first colour image to form the colour image.

According to a second aspect of the invention, there is provided an apparatus for detecting a face-like region of a colour image, comprising a data processor arranged to reduce the resolution of the colour image by averaging the saturation to form a reduced resolution image and to search for a region of the reduced resolution image having, in a predetermined shape, a substantially uniform saturation which is substantially different from the saturation of the portion of the reduced resolution image surrounding the predetermined shape.

According to a third aspect of the invention, there is provided an observer tracking display including an apparatus according to the second aspect of the invention.

It is known that human skin tends to be of uniform saturation. The present method and apparatus make use of this property and provide an efficient method of finding candidates for faces in colour images. A wider range of lighting conditions can be accommodated without the need for colour calibration so that this technique is more reliable and convenient than the known techniques. By reducing the resolution of the saturation of the image, computational requirements are substantially reduced and a relatively simple method may be used. Averaging increases the uniformity of saturation in a face region so that this technique is capable of recognising candidates for faces in images of people of different ages, sexes and skin colours and can even cope with the wearing of glasses of light colour. Because this technique is very efficient, it can be implemented in real time and may be used in low cost commercial applications.

This technique may be used in the initial stage 9 shown in FIG. 3 of the accompanying drawings for the image tracking system disclosed in EP 0 877 274 and GB 2 324 428. Further, this technique may be used as the first part of a two stage face detection and recognition techniques as disclosed, for instance in U.S. Pat. Nos. 5,164,992, 5,012,522, Turk et al "Eigen faces for Recognition", Journal 1 of Cognitive Neuroscience, vol 3, No 1, pages 70 to 86, 1991, Yuille et al, "Feature Extraction from Faces using Deformable Templates", International Journal of Computer Vision, 8(2), pages 99 to 111, 1992 and Yang et al, "Human Face Detection in Complex Background", Pattern Recognition, vol 27, No 1, pages 53 to 63, 1994. In such two stage techniques, the first stage locates the approximate position of the face and the second stage provides further analysis of each candidate's face region to confirm the existence of the face and to extract accurate facial features such as eyes, nose and lips. The first stage does not require high accuracy and so may be implemented with fast algorithms. The number of image regions which have to be analysed in the second stage is limited by the first stage. This is advantageous because the second stage generally requires more sophisticated algorithms and is thus more computing-intensive.

The invention will be further described by way of example, with reference to the accompanying drawings, in which.

Like reference numerals refer to like parts throughout the drawings.

Figure 6:
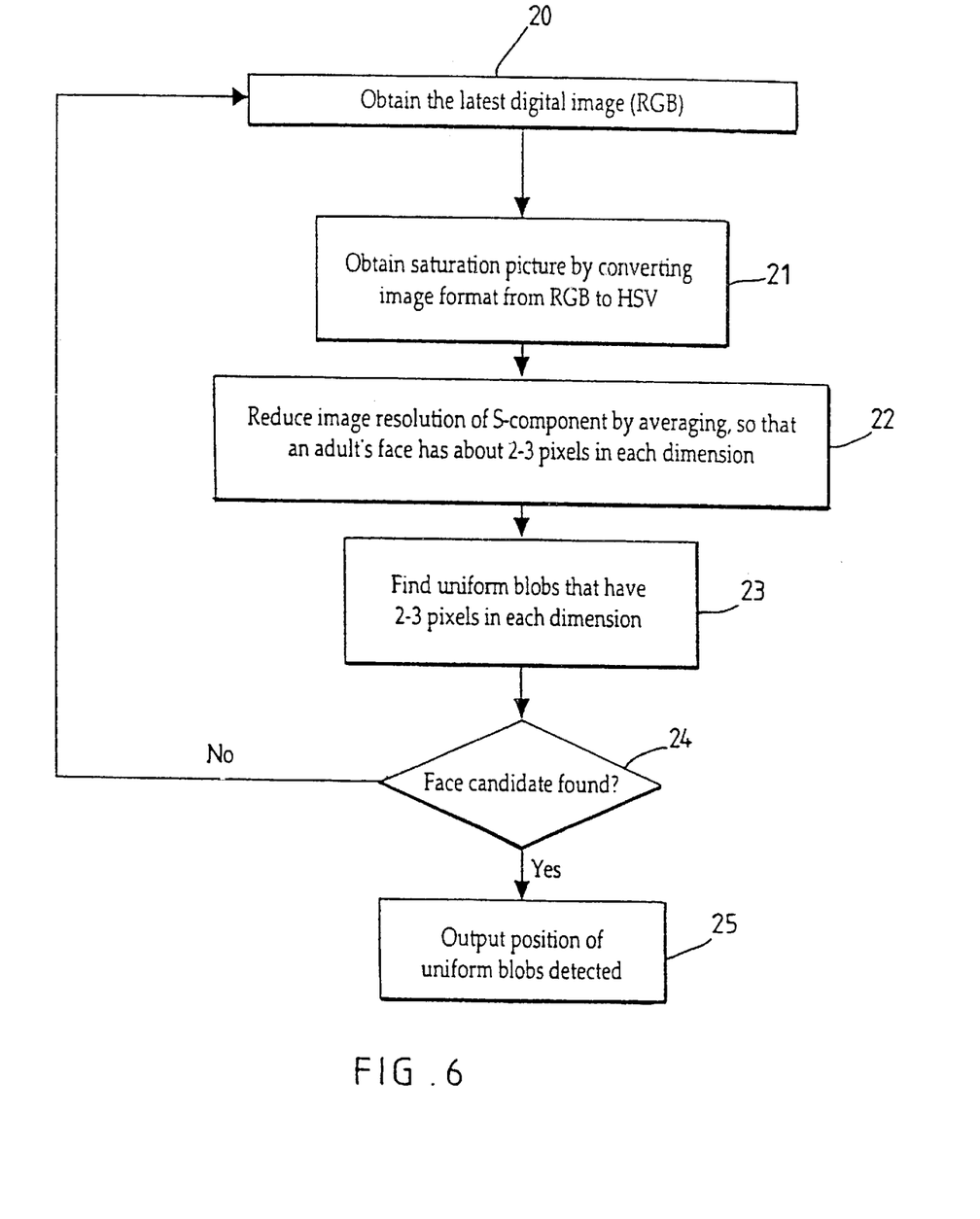
FIG. 6 is a flow diagram illustrating a method of detecting face-like regions constituting an embodiment of the present invention.

FIG. 6 illustrates in flow diagram form a method of automatically detecting and locating face-like regions of a pixellated colour image from a video image sequence. The video image sequence may be supplied in real time, for instance by a video camera of the type described hereinbefore with reference to FIG. 2. The method is capable of operating in real time as part of the initialisation stage 9 shown in FIG. 3.

In a step 20, the latest digital image in the red, green, blue (RGB) format is obtained. For instance, this step may comprise storing the latest field of video data from the video camera in a field store. In a step 21, the video image is converted from the RGB format to the HSV format so as to obtain the saturation of each pixel. In practice, it is sufficient to obtain the S component only in the step 21 and this may be used to overwrite the RGB pixel data or one component thereof in the field store so as to minimise memory requirements.

Figure 7:
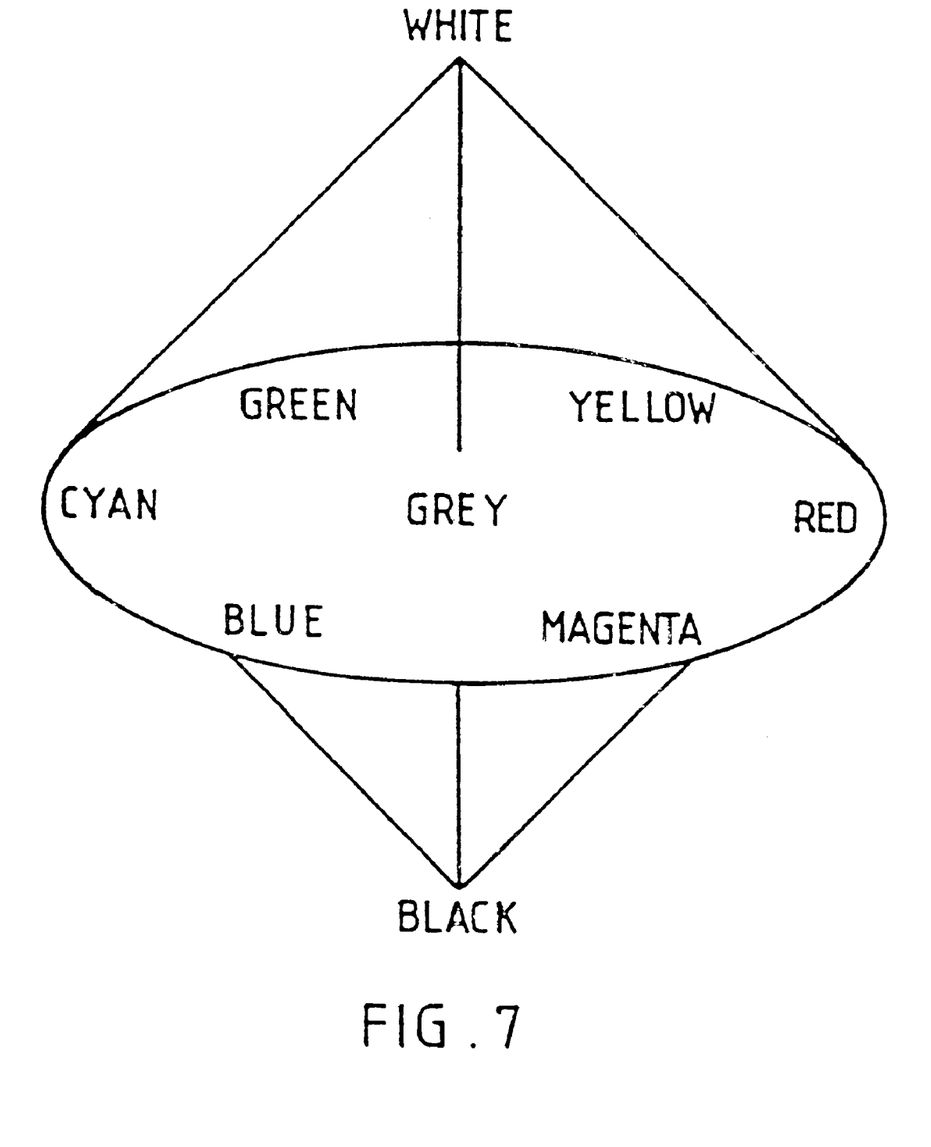
FIG. 7 is a diagram illustrating a hue saturation value (HSV) colour scheme.

The RGB format is a hardware-oriented colour scheme resulting from the way in which camera sensors and display phosphors work. The HSV format is one of several formats including hue saturation intensity (HSI) and hue lightness saturation (HLS) and is more closely related to the concepts of tint, shade and tone. In the HSV format, hue represents colour as described by the wavelength of light (for instance, the distinction between red and yellow), saturation represents the amount of colour that is present (for instance, the distinction between red and pink), and lightness, intensity or value represents the amount of light (for instance, the distinction between dark red and light red or between dark grey and light grey). The "space" in which these values may be plotted can be shown as a circular or hexagonal cone or double cone, for instance as illustrated in FIG. 7, in which the axis of the cone is the grey scale progression from black to white, distance from the axis represents saturation and the direction or angle about the axis represents the hue.

The colour of human skin is created by a combination of blood (red) and melanin (yellow, brown). Skin colours lie between these two extreme hues and are somewhat saturated but are not extremely saturated. The saturation component of the human face is relatively uniform.

Several techniques exist for converting video image data from the RGB format to the HSV, HSI or HLS format. Any technique which extracts the saturation component may be used. For instance, the conversion may be performed in accordance with the following expression for the saturation component S:

$$S=0 \text{ for } \max(R,G,B)=0$$

$$S=(\max(R,G,B)-\min(R,G,B))/\max(R,G,B)$$

otherwise

Following the conversion step 21, the spatial image resolution of the saturation component is reduced by averaging in a step 22. As described hereinbefore with reference to FIG. 2, the approximate distance of the face of an observer from the display is known so that the approximate size of a face in each video image is known. The resolution is reduced such that the face of an adult observer occupies about 2 to 3 pixels in each dimension as indicated in FIG. 6. A technique for achieving this will be described in more detail hereinafter.

A step 23 detects, in the reduced resolution image from the step 22, regions or "blobs" of uniform saturation of predetermined size and shape surrounded by a region of reduced resolution pixels having a different saturation. A technique for achieving this is also described in more detail hereinafter. A step 24 detects whether a face candidate or face-like region has been found. If not, the steps 20 to 24 are repeated. When the step 24 confirms that at least one candidate has been found, the position of the or each uniform blob detected in the step 23 is output at a step 25.

Figure 8:
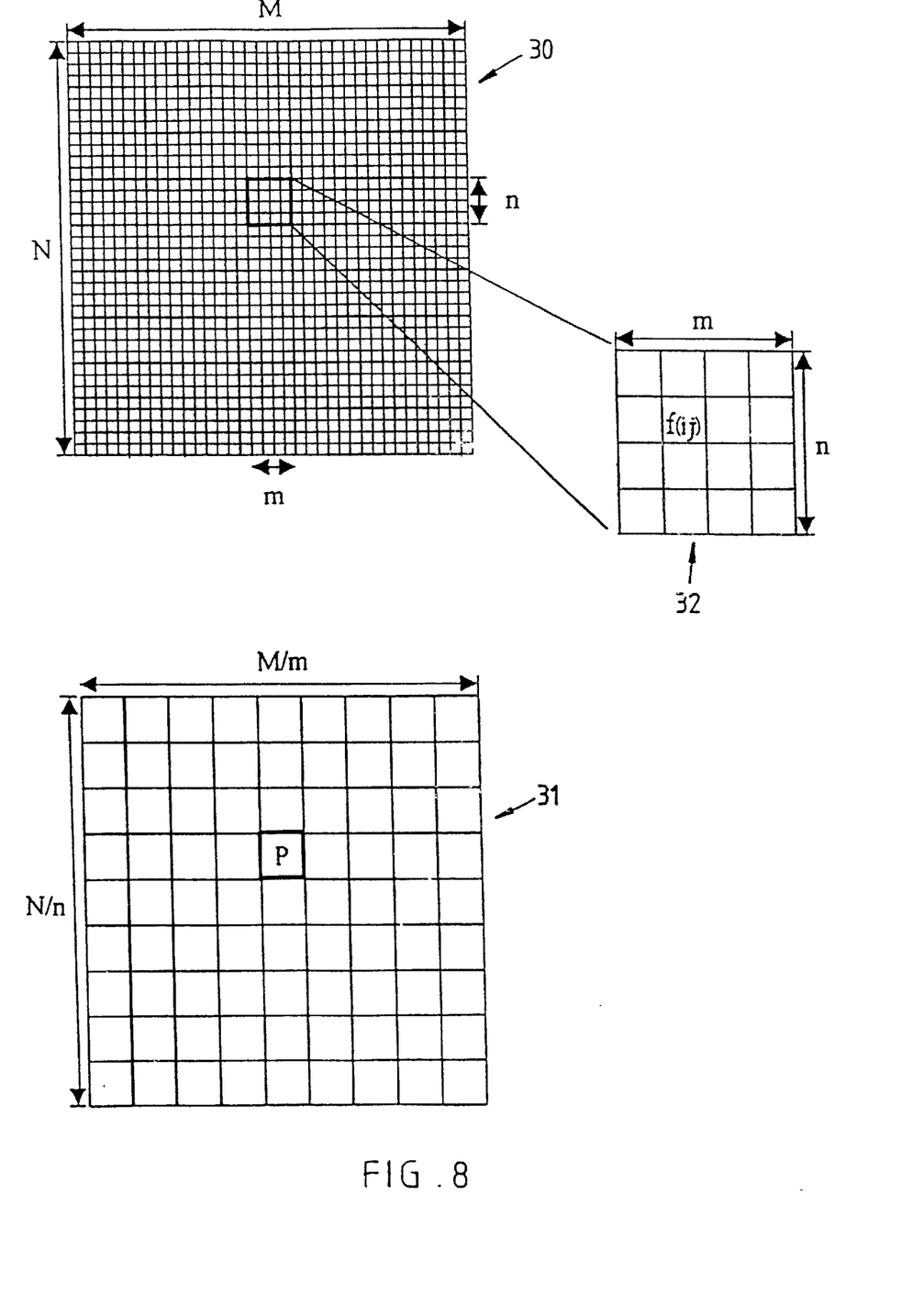
FIG. 8 is a diagram illustrating image resolution reduction by averaging in the method illustrated in FIG. 6.

FIG. 8 illustrates the image resolution reduction step 22 in more detail. 30 illustrates the pixel structure of an image supplied to the step 20. The spatial resolution is illustrated as a regular rectangular array of M×N square or rectangular pixels. The spatial resolution is reduced by averaging to give an array of (M/m)×(N/n) pixels as illustrated at 31. The array of pixels 30 is effectively divided up into "windows" or rectangular blocks of pixels 32, each comprising m×n pixels of the structure 30. The S values of the pixels are indicated in FIG. 8 as f(i,j), for $0 \leq i < m$ and $0 \leq j < n$. The average saturation value P of the window is calculated as:

$$P = (1/mn) \sum_{i=o}^{m-1} \sum_{j=o}^{n-1} f(i, j)$$

In the embodiment illustrated in the drawings, the reduction in spatial resolution is such that an adult observer face occupies about 2 to 3 of the reduced resolution pixels in each dimension.

Figure 9:
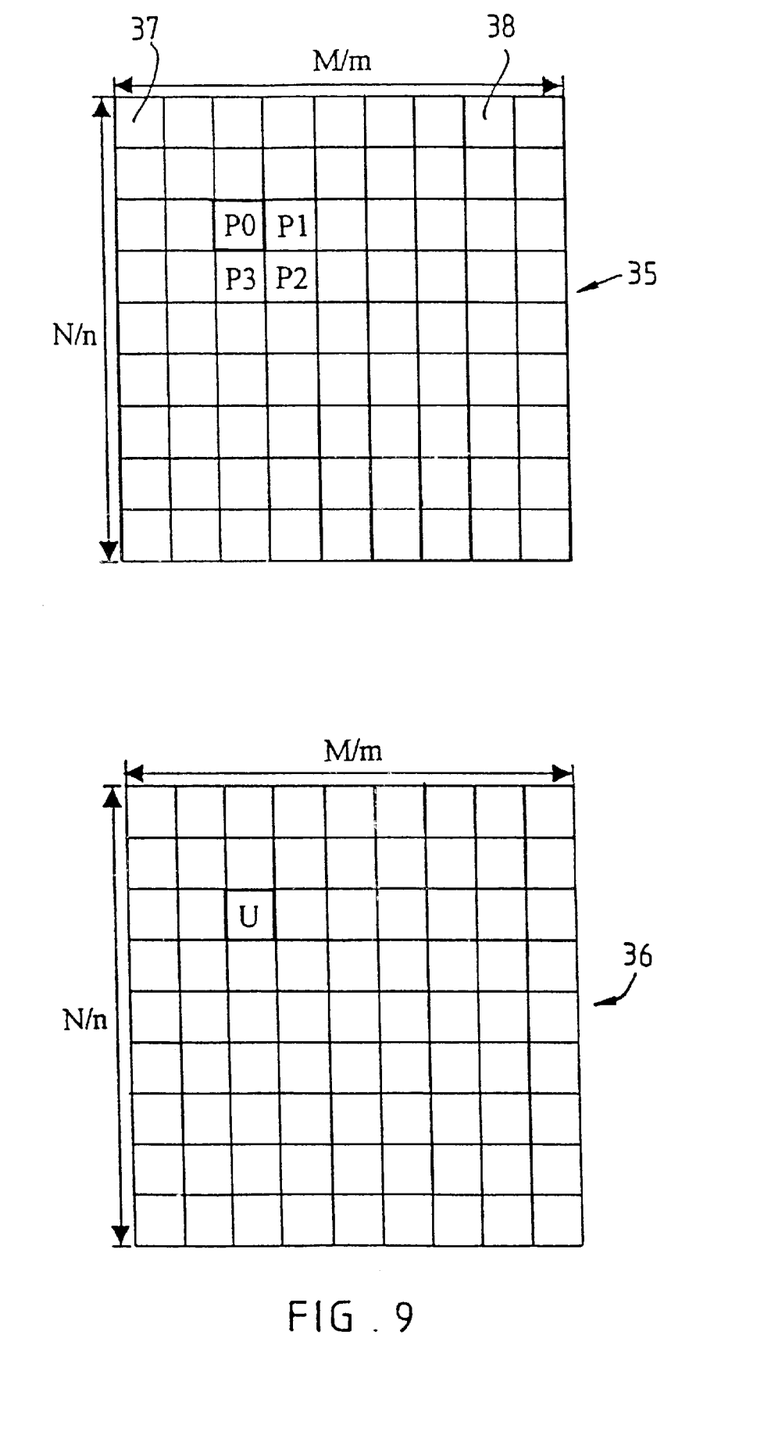
FIG. 9 is a diagram illustrating calculation of uniformity values in the method illustrated in FIG. 6.

The step 23 comprises assigning a uniformity status or value U to each reduced resolution pixel and then detecting patterns of uniformity values representing face-like regions. The uniformity value is 1 or 0 depending on the saturations of the pixel and its neighbours. FIG. 9 illustrates at 35 a pixel having an averaged saturation value $P_0$ whose uniformity U shown at 36 in FIG. 9 is to be calculated from $P_0$ and the averaged saturation values $P_1$, $P_2$ and $P_3$ of the three neighbouring pixels. Assigning uniformity values begins at the top left pixel 37 and proceeds from left to right until the penultimate pixel 38 of the top row has been assigned its uniformity value. This process is then repeated for each row in turn from top to bottom ending at the penultimate row. By "scanning" the pixels in this way and using neighbouring pixels to the right and below the pixel whose uniformity value has been calculated, it is possible to replace the average saturation values P with the uniformity values U by overwriting into the store so that memory capacity can be used efficiently and it is not necessary to provide farther memory capacity for the uniformity values.

The uniformity status U is calculated as:

$U=1$ if $(f \max - f \min)/f \max \leq T$ $U=0$ otherwise where T is a predetermined threshold, for instance having a typical value of 0.15, fmax is the maximum of $P_0$, $P_1$, $P_2$ and $P_3$, and fmin is the minimum of $P_0$, $P_1$, $P_2$ and $P_3$.

Figure 10:
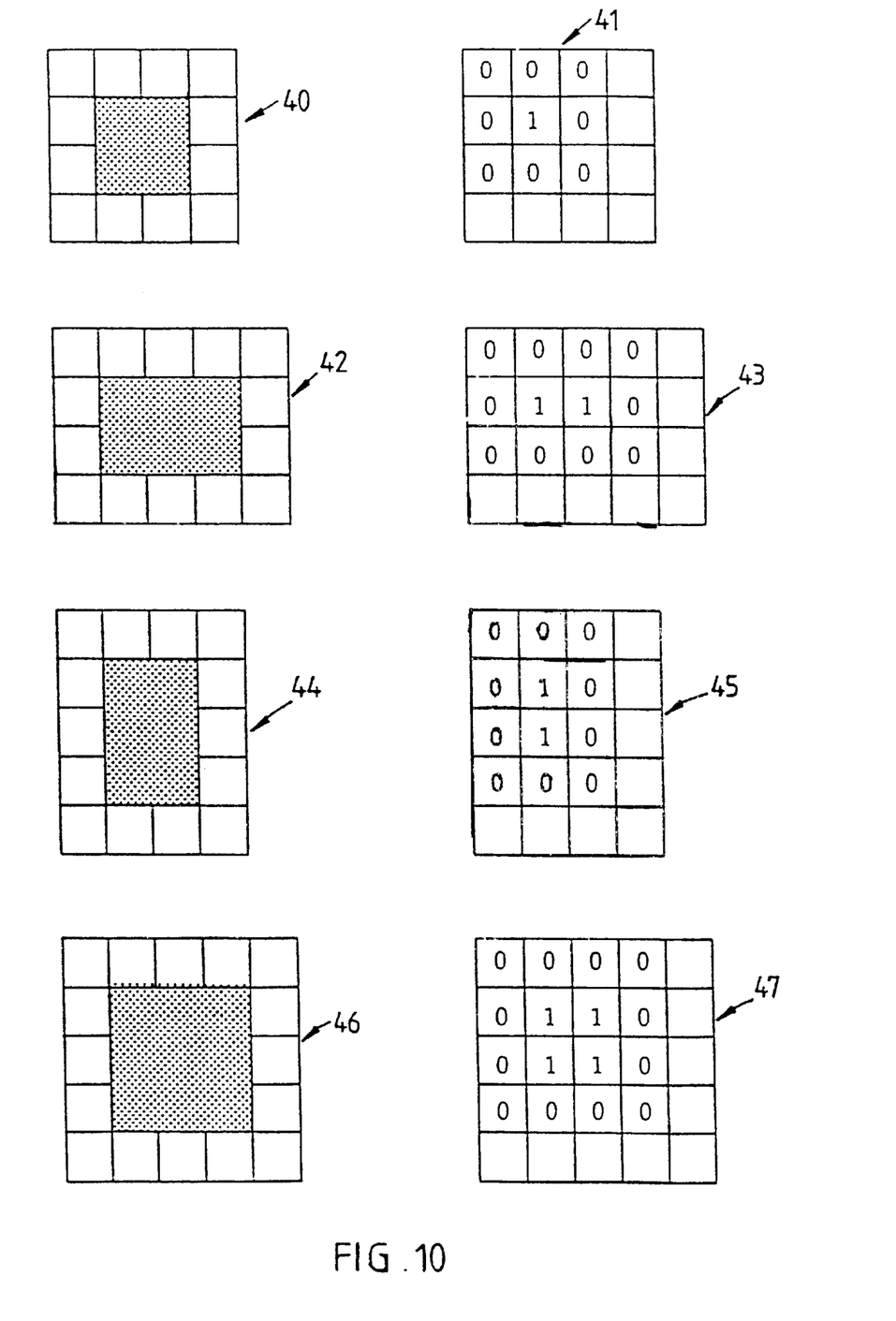
FIG. 10 is a diagram illustrating patterns used in face-candidate selection in the method illustrated in FIG. 6.

When the ascribing of the uniformity values has been completed, the array 36 contains a pattern of 0s and 1s representing the uniformity of saturation of the reduced resolution pixels. The step 23 then looks for specific patterns of 0s and 1s in order to detect face-like regions. FIG. 10 illustrates an example of four patterns of uniformity values and the corresponding pixel saturation patterns which are like the face candidates in the video image. FIG. 10 shows at 40 a uniform blob in which dark regions represent averaged saturation values of sufficient uniformity to indicate a face-like region. The surrounding light regions or squares represent a region surrounding the uniform saturation pixels and having substantially different saturations. The corresponding pattern of uniformity values is illustrated at 41 and comprises a pixel location with the uniformity value 1 completely surrounded by pixel locations with the uniformity value 0.

Similarly, FIG. 10 shows at 42 another face-like region and at 43 the corresponding pattern of uniformity values. In this case, two horizontally adjacent pixel locations have the uniformity value 1 and are completely surrounded by pixel locations having the uniformity value 0. FIG. 10 illustrates at 44 a third pattern whose uniformity values are as shown at 45 and are such that two vertically adjacent pixel locations have the uniformity value 1 and are surrounded by pixel locations with the uniformity value 0.

The fourth pattern shown at 46 in FIG. 10 has a square block of four (two-by-two) pixel locations having the uniformity value 1 completely surrounded by pixel locations having the uniformity value 0. Thus, whenever any of the uniformity value patterns illustrated at 41, 43, 45 and 47 in FIG. 10 occurs, the step 23 indicates that a face-like region or candidate has been found. Searching for these patterns can be performed efficiently. For instance, the uniformity values of the pixel locations are checked in turn, for instance scanning left to right in each row and top to bottom of the field. Whenever a uniformity of value of 1 is detected, the neighbouring pixel locations to the right and below the current pixel location are inspected. If at least one of these uniformity values is also 1 and the region is surrounded by uniformity values of 0, then a pattern corresponding to a potential face candidate is found. The corresponding pixel locations may then be marked, for instance by replacing their uniformity values with a value other than 1 or 0, for example a value of 2. Unless no potential face candidate has been found, the positions of the candidates are output.

Figure 11:
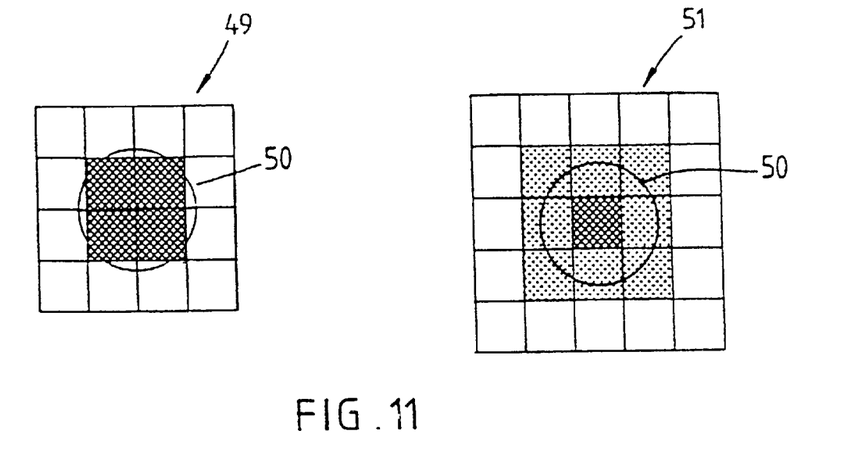
FIG. 11 is a diagram illustrating the effect of different positions of a face on the method illustrated in FIG. 6.

The appearance of the patterns 40, 42, 44 and 46 may be affected by the actual position of the face-like region in relation to the structure of the reduced resolution pixels 36. FIG. 11 illustrates an example of this for a face-like region having a size of two-by-two reduced resolution pixels as shown at 49. If the face-like region indicated by a circle 50 is approximately centred at a two-by-two block, the pattern 47 of uniformity values will be obtained and detection will be correct. However, if the face were shifted by the extent of half a pixel in both the horizontal and vertical directions as illustrated at 51, the centre part of the face-like region may have a uniformity value which is different from the surrounding region as illustrated at 51. This may result in failure to detect a genuine candidate.

Figure 12:
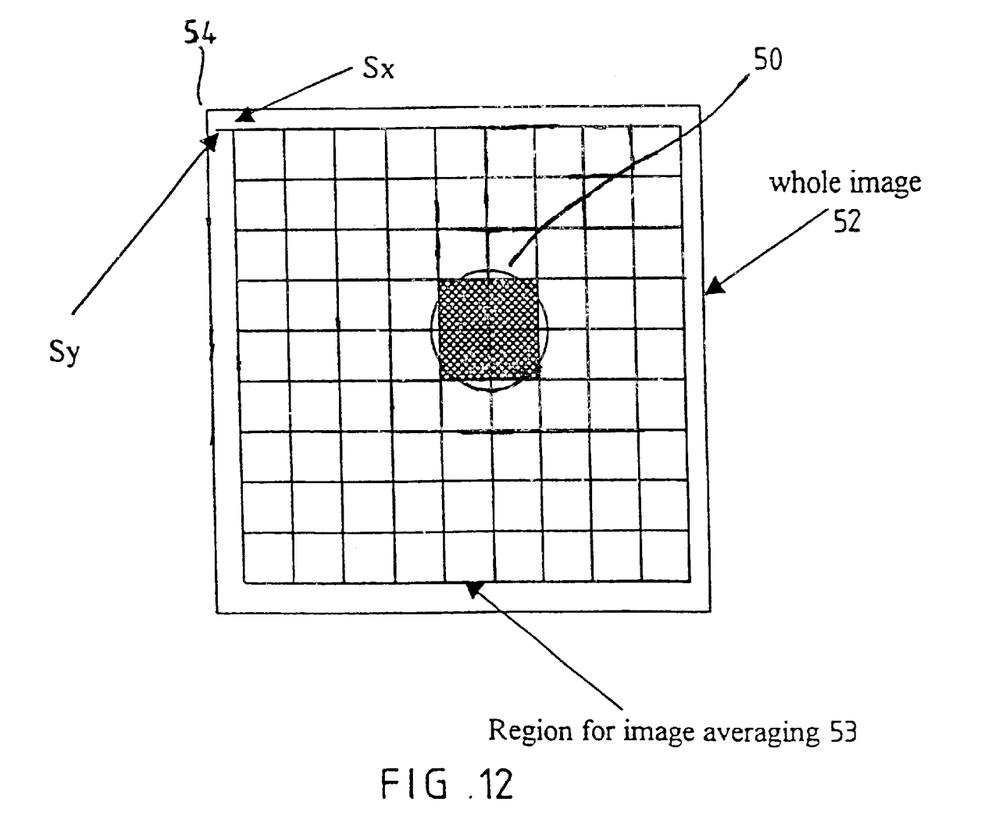
FIG. 12 is a diagram illustrating a modification to the method illustrated in FIG. 6 for accommodating different face positions.

In order to avoid this possible problem, the steps 21 to 24 may be repeated for the same video field or for one or more succeeding video fields of image data. However, each time the steps 21 to 24 are repeated, the position of the array 31 of reduced resolution pixels is changed with respect to the array 30 of the colour image pixels. This is illustrated in FIG. 12 where the whole image is illustrated at 52 and the region used for spatial resolution reduction by image averaging is indicated at 53. The averaging is performed in the same way as illustrated in FIG. 8 but the starting position is changed. In particular, whereas the starting position for the first pixel in FIG. 8 is at the top left corner 54 of the whole image 52, FIG. 12 illustrates a subsequent averaging where the starting position is shifted from the top left corner by an amount Sx to the right in the horizontal direction and Sy downwardly in the vertical direction, where:

$$0 < Sx < m \text{ and } 0 < Sy < n$$

Each image may be repeatedly processed such that all combinations of the values of Sx and Sy are used so that mxn processes must be performed. However, in practice, it is not necessary to use all of the starting positions, particularly in applications where the detection of face-like regions does not have to be very accurate. For instance, where the face-like region detection forms the first step of a two step process as mentioned hereinbefore, the values of Sx and Sy may be selected from a more sparse set of combinations such as:

$$Sx = ix(m/k) \text{ and } Sy = jx(n/l)$$

where i, j, k and l are integers satisfying the following relationships:

$$0 \leq i < k$$
$$0 \leq j < l$$
$$1 \leq k < m$$
$$1 \leq l < n$$

This results in a total of kxl combinations.

As mentioned hereinbefore, the steps 21 to 24 may be repeated with the different starting positions on the same image or on a sequence of images. For real time image processing, it may be necessary or preferable to repeat the steps for the images of a sequence. The method may be performed very quickly and can operate in real time at between 10 and 60 Hz field rate depending on the number of face candidates present in the image. Thus, within a short period of the order of a very few seconds or less, all possible positions can be tested.

The method illustrated in FIG. 6 may be performed on any suitable hardware, such as that illustrated in FIG. 2. The tracking processor 4 as described hereinbefore is capable of being programmed to implement the method of FIG. 6 as part of the initialisation stage 9 shown in FIG. 3. The data processing is performed by the R4400 processor and associated memory and the processor 4 includes a video digitiser and frame store as illustrated in FIG. 2 for storing the saturation values, the averaged saturation values of the reduced resolution pixels and the uniformity values.

The method illustrated in FIG. 6 works well with uniform lighting including ambient lighting and is applicable to applications under poor lighting conditions by using an active light source. Although the method does not require any special lighting and is very resilient to changes in the lighting of an observer, an active light source may be used during the initialisation stage 9 of FIG. 2 and then switched off during subsequent observer tracking, which is highly robust and does not require special lighting.

Figure 13:
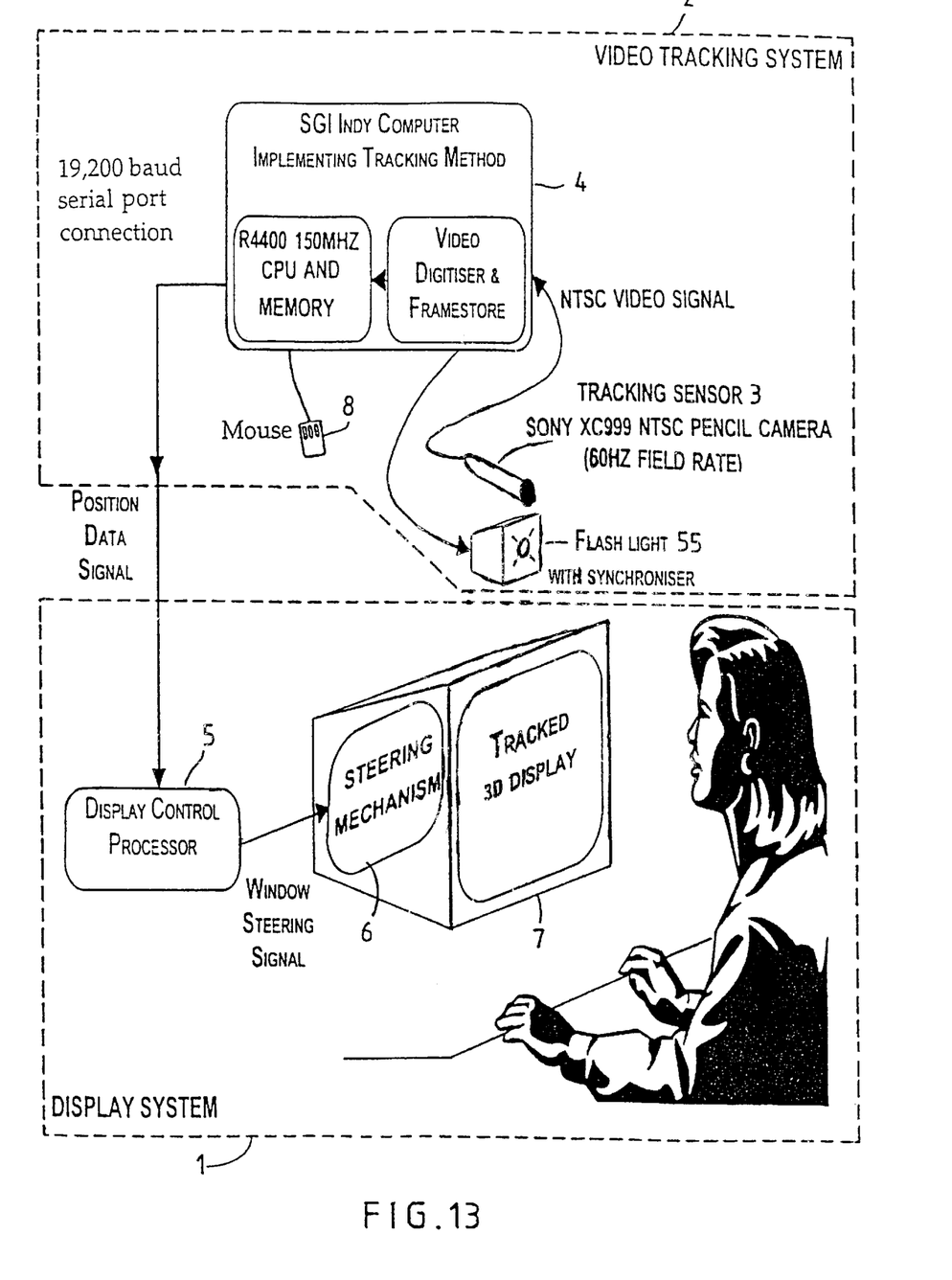
FIG. 13 is a block schematic diagram of an observer tracking display to which the present invention is applied.

FIG. 13 shows a display of the type shown in FIG. 2 modified to provide active lighting. The active light source comprises a flash light 55 with a synchroniser controlled by the processor 4. The flash light 55 is disposed in a suitable position, such as above the display 7 and adjacent the sensor 3, for illuminating the face of an observer.

Figure 14:
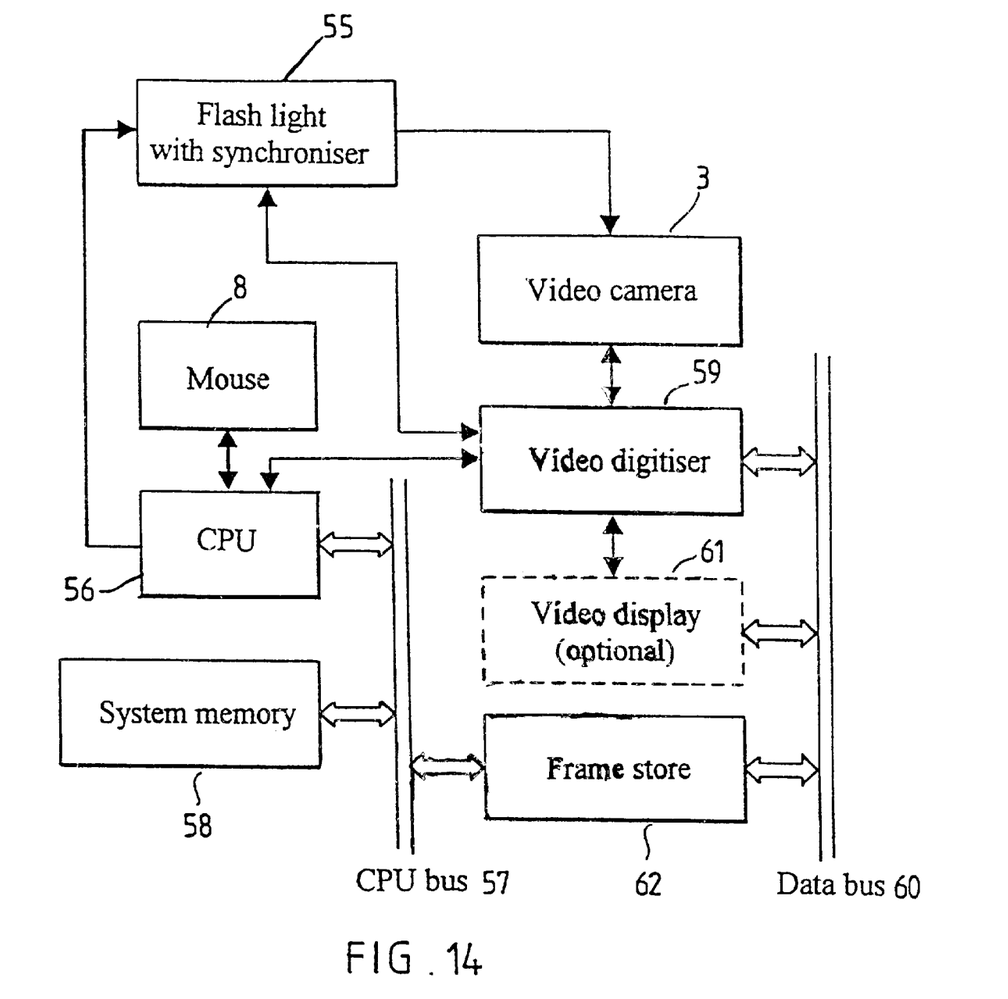
FIG. 14 is a system block diagram of a video tracking system of the display of FIG. 13 for performing the method of the invention.

FIG. 14 illustrates the video tracking system 2 and specifically the data processor 4 in more detail. The data processor comprises a central processing unit (CPU) 56 connected to a CPU bus 57. A system memory 58 is connected to the bus 57 and contains all of the system software for operating the data processor.

The video camera 3 is connected to a video digitiser 59 which is connected to a data bus 60, to the flash light with synchroniser 55, to the CPU 56 and to an optional video display 61 when provided. A frame store 62 is connected to the data bus 60 and the CPU bus 57.

For embodiments not using active lighting, the frame store need only have a capacity of one field. In the case of the video camera 3 described hereinbefore and having a field resolution of 640×240 pixels and for a 24 bit RGB colour signal, a capacity of 640×240×3=460800 bytes is required. For embodiments using active lighting, the frame store 62 has a capacity of two fields of video data, ie: 921600 bytes.

In use, the flash light 55 is synchronised with the video camera 3 and with the video digitiser 59 so that the flash light is switched on or off at the appropriate time when an image is being captured.

The flash light 55 is used to flash light at the face of the observer so as to improve the uniformity of distribution. If the flash light 55 is much stronger than the ambient light, the intensity of the face is largely determined by the flash light 55. However, the use of a strong light source tends to produce an over-saturated image, in which many objects may be falsely detected as face-like regions. Further, the use of a powerful flashing light may become-unpleasant to the observer and might cause damage to the eyes.

The flash light 55 should therefore be of mild intensity. In this case, the effects of ambient light may need to be reduced so as to improve the reliability of detecting genuine face-like regions.

The method illustrated in FIG. 6 may be modified so as to compare two consecutive frames of video image data in which one is obtained with the flash light 55 illuminated and the other is obtained with ambient light only. The first of these therefore contains the effect of both the ambient light and the flash light 55. This first image I(a+f) may therefore be considered to comprise two components:

$$I(a+f) = I(a) + I(f)$$

where I(a) is the ambient light-only image and I(f) is the image which would have been produced if the only light source where the flash light 55. This may be rewritten as:

$$I(f) = I(a+f) - I(a)$$

Thus, by subtracting the image pixel data or the reduced resolution data in the step 21 or the step 22, the effect of over-saturation of the background by the flash light 55 may be reduced. A further reduction may be obtained by ensuring that the flash light 55 largely directs its light to the region which is likely to be occupied by the face of the observer.

What claimed is:

1. A method of detecting a face-like region of a colour image, comprising the steps of:
   reducing the resolution of the colour image by averaging the saturation of fixed size areas of the image to form a reduced resolution image;
   determining a uniformity status for each reduced resolution pixel based on the saturations of each pixel and its neighboring pixels; and
   based on the determining, searching for a region of the reduced resolution image having, in a predetermined shape, a substantially uniform saturation which is substantially different from the saturation of the portion of the reduced resolution image surrounding the predetermined shape, wherein the colour image comprises a rectangular array of M by N picture elements, the reduced resolution image comprises (M/m) by (N/n) picture elements, each of which corresponds to m by n picture elements in the colour image, where m and n are integers, 1<m<M, and 1<n<N.

2. A method as claimed in claim 1, wherein the colour image comprises a plurality of picture elements and the resolution is reduced such that the predetermined shape is from two to three reduced resolution picture elements across.

3. A method as claimed in claim 2, wherein the saturation P of each picture element of the reduced resolution image is given by:

$$P = (1/mn) \sum_{i=0}^{m-1} \sum_{j=o}^{n-1} f(i, j)$$

where f (i,j) is the saturation of the picture element of the ith column and the jth row of the m by n picture elements.

4. A method as claimed in claim 2, further comprising the step of repeating the resolution reduction and searching at least once with the reduced resolution picture elements shifted with respect to the colour image picture elements.

5. A method as claimed in claim 1, further comprising the step of storing the saturations of each picture element of the reduced resolution image in a store.

6. A method as claimed in claim 1, wherein a uniformity value is ascribed to each of the reduced resolution picture elements by comparing the saturation of each of the reduced resolution picture elements with the saturation of at least one adjacent reduced resolution picture element.

7. A method as claimed in claim 6, wherein each uniformity value is ascribed a first value if $$(\max (P) - \min(P)) \max(P) \leq T$$

where max (P) and min (P) are the maximum and minimum values, respectively, of the saturations of the reduced resolution picture element and each adjacent picture element and T is a threshold, and a second value different from the first value otherwise.

8. A method as claimed in claim 7, wherein T is substantially equal to 0.15.

9. A method as claimed in claim 6, wherein the resolution is reduced such that the predetermined shape is two or three reduced resolution picture elements across and in which the method further comprises indicating detection of a face-like region when a uniformity value of the first value is ascribed to any of one reduced resolution picture element, two vertically or horizontally adjacent reduced resolution picture elements and a rectangular two-by-two array of picture elements and when a uniformity value of the second value is ascribed to each surrounding reduced resolution picture element.

10. A method as claimed in claim 9, further comprising the step of storing the saturations of each picture element of the reduced resolution image in a store, wherein detection is indicated by storing a third value different from the first and second values in the store in place of the corresponding uniformity value.

11. A method as claimed in claim 6, further comprising the step of storing the saturations of each picture element of the reduced resolution image in a store, wherein at least one adjacent reduced resolution picture element has not been ascribed a uniformity value and each uniformity value is stored in the store in place of the corresponding saturation.

12. A method as claimed in claim 1, wherein the saturation is derived from red, green and blue components as $$(\max(R,G,B) - \min(R,G,B))/\max(R,G,B)$$

where max (R,G,B) and min (R,G,B) are the maximum and minimum values respectively, of the red, green and blue components.

13. A method as claimed in claim 1, further comprising the step of capturing the colour image.

14. A method as claimed in claim 13, wherein the colour image is captured by a video camera and the resolution reduction and searching are repeated for different video fields or frames from the video camera.

15. A method as claimed in claim 14, wherein a first colour image is captured while illuminating an expected range of positions of a face, a second colour image is captured using ambient light, and the second colour image is subtracted from the first colour image to form the colour image.

16. A method as claimed in claim 1, wherein the step of reducing the resolution is carried out by averaging only the saturation of fixed size areas of the image to form the reduced resolution image.

17. A method as claimed in claim 1, wherein the fixed size areas of the image each have the same size, and the saturation P of each picture element of the reduced resolution image is given by:

$$P = (1/mn) \sum_{i=0}^{m-1} \sum_{j=o}^{n-1} f(i, j)$$

where f(i,j) is the saturation of the picture element of the ith column and the jth row of the m by n picture elements.

18. An apparatus for detecting a face-like region of a colour image, comprising a data processor with means to reduce the resolution of the colour image by averaging the saturation of fixed size areas of the image to form a reduced resolution image, means for determining a uniformity status for each reduced resolution pixel based on the saturations of each pixel and its neighboring pixels, and means to search, based on the determining, for a region of the reduced resolution image having, in a predetermined shape, a substantially uniform saturation which is substantially different from the saturation of the portion of the reduced resolution image surrounding the predetermined shape, wherein the colour image comprises a rectangular array of M by N picture elements, the reduced resolution image comprises (M/m) by (N/n) picture elements, each of which corresponds to m by n picture elements in the colour image, where m and n are integers, 1<m<M, and 1<n<N.

19. An observer tracking display comprising:

a tracking system; and a display system co-operating with a tracking system, the display system receiving a position data signal from the tracking system, wherein the tracking system includes an apparatus for detecting a face-like region of a color image, the apparatus is one according to claim 18.

20. An apparatus as claimed in claim 16, wherein the means to reduce the resolution averages only the saturation of fixed size areas of the image to form the reduced resolution image.

* * * * *